United States Patent
Ahmadvand et al.

(10) Patent No.: US 12,229,208 B2
(45) Date of Patent: Feb. 18, 2025

(54) RESPONSIVE CATEGORY PREDICTION FOR USER QUERIES

(71) Applicant: Home Depot Product Authority, LLC, Atlanta, GA (US)

(72) Inventors: Ali Ahmadvand, Atlanta, GA (US); Surya Kallumadi, Atlanta, GA (US); Faizan Javed, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 401 days.

(21) Appl. No.: 17/487,732

(22) Filed: Sep. 28, 2021

(65) Prior Publication Data

US 2022/0100806 A1    Mar. 31, 2022

Related U.S. Application Data

(60) Provisional application No. 63/085,518, filed on Sep. 30, 2020.

(51) Int. Cl.
*G06F 16/954* (2019.01)
*G06F 18/214* (2023.01)
(Continued)

(52) U.S. Cl.
CPC ........ *G06F 16/954* (2019.01); *G06F 18/2148* (2023.01); *G06F 40/205* (2020.01); *G06N 3/04* (2013.01)

(58) Field of Classification Search
CPC .. G06F 16/954; G06F 18/2148; G06F 40/205; G06F 18/214; G06F 40/284;
(Continued)

(56) References Cited

U.S. PATENT DOCUMENTS 10,282,462 B2   5/2019  Magnani et al.
2008/0183685 A1  7/2008  He et al.
(Continued)

OTHER PUBLICATIONS

Hayashi, Teruaki, et al. "Variable Quest: network visualization of variable labels unifying co-occurrence graphs." IEEE International Conference on Data Mining Workshops (ICDMW). IEEE, 2017, pp. 577-583 (Year: 2017).*

(Continued)

*Primary Examiner* — Jesse S Pullias
*Assistant Examiner* — Michael C. Lee
(74) *Attorney, Agent, or Firm* — Greenberg Traurig, LLP

(57) ABSTRACT

A method for determining a category responsive to a user query is disclosed. The method includes receiving a training data set comprising a plurality of data pairs, each data pair including: (i) a query; and (ii) an associated one or more categories that are responsive to the query, wherein the one or more categories in the training data set defines a plurality of categories. The method includes training a machine learning algorithm, according to the training data set, to create a trained model, wherein training the machine learning algorithm includes: creating a first co-occurrence data structure defining co-occurrence of respective word representations of the queries with the plurality of categories, and creating a second co-occurrence data structure defining co-occurrence of respective categories in respective data pairs. The method also includes deploying the trained model to return one or more categories in response to a new query input.

15 Claims, 6 Drawing Sheets

(51) Int. Cl.
*G06F 40/205* (2020.01)
*G06N 3/04* (2023.01)

(58) Field of Classification Search
CPC .......... G06F 40/30; G06F 40/35; G06N 3/04; G06N 3/045; G06N 3/08
See application file for complete search history.

(56) References Cited

U.S. PATENT DOCUMENTS

| | | | |
|---|---|---|---|
| 2011/0288956 A1 | 11/2011 | Yuan | |
| 2012/0215626 A1 | 8/2012 | Ramer et al. | |
| 2013/0282727 A1* | 10/2013 | Muraoka | G06F 16/313 707/740 |
| 2017/0235848 A1 | 8/2017 | Van Dusen et al. | |
| 2019/0205761 A1 | 7/2019 | Wu et al. | |
| 2019/0392082 A1* | 12/2019 | Bell | G06N 3/08 |
| 2020/0242302 A1 | 7/2020 | Liang et al. | |
| 2021/0081613 A1* | 3/2021 | Begun | G06F 16/93 |
| 2021/0081832 A1* | 3/2021 | Ji | G06F 18/2411 |
| 2021/0182501 A1* | 6/2021 | Tu | G06F 40/40 |
| 2021/0279414 A1* | 9/2021 | Mrini | G06F 40/211 |
| 2021/0383191 A1* | 12/2021 | Ainslie | G06N 3/045 |
| 2022/0100786 A1* | 3/2022 | Ding | G06N 20/20 |

OTHER PUBLICATIONS

Devlin, Jacob, et al. "Bert: Pre-training of deep bidirectional transformers for language understanding." arXiv preprint arXiv:1810.04805 (May 24, 2019), pp. 1-16 (Year: 2019).*
Chen, Wanyu, et al. "Hierarchical neural query suggestion with an attention mechanism." Information Processing & Management 57.6 (May 18, 2019), pp. 1-15 (Year: 2019).*
Manchanda, Saurav, et al. "Intent term selection and refinement in e-commerce queries." arXiv preprint arXiv:1908.08564 (2019), pp. 1-11 (Year: 2019).*
Zhang, Shuai, et al. "Next item recommendation with self-attention." arXiv preprint arXiv:1808.06414 (2018). (Year: 2018).*
Brian Babcock, Surajit Chaudhuri, and Gautam Das. "Dynamic sample selection for approximate query processing". In: SIGMOD. 2003, pp. 539-550.
Piotr Bojanowski et al. "Enriching word vectors with subword information". In: (2017), pp. 135-146.
Alexis Conneau et al. "Very deep convolutional networks for text classifcation". In: proceedings of EACL. 2017.
W Bruce Croft et al. "Query representation and understanding workshop". In: SIGIR Forum. vol. 44. 2. 2010, pp. 48-53.
Jung-Woo Ha, Hyuna Pyo, and Jeonghee Kim. "Large-scale item categorization in e-commerce using multiple recurrent neural networks". In: SIGKDD. ACM. 2016, pp. 107-115.
Y. Kim. "Convolutional neural networks for sentence classication". In: EMNLP. 2014. No Author Given.
Dongsheng Li et al. "Stable Matrix Approximation for Top-N Recommendation on Implicit Feedback Data". In: Proceedings of the 51st Hawaii International Conference on System Sciences. 2018.
Jingzhou Liu et al. "Deep learning for extreme multi-label text classifcation". In: proceedings of SIGIR. 2017, pp. 115-124.
Rupesh K Srivastava, Klaus Gref and Jurgen Schmidhuber. "Training very deep networks". In: NIPS. 2015, pp. 2377-2385.
Jian Tang, Meng Qu, and Qiaozhu Mei. "Pte: Predictive text embedding through large-scale heterogeneous text networks". In: SIGKDD. ACM. 2015, pp. 1165-1174.
Jian Tang et al. "Line: Large-scale information network embedding". In: WWW. 2015, pp. 1067-1077.
Ashish Vaswani et al. "Attention is all you need". In: NIPS. 2017, pp. 5998-6008.
Guoyin Wang et al. "Joint embedding of words and labels for text classication". In: ACL. 2018.
Hongfei Zhang et al. "Generic intent representation in web search". In: SIGIR. ACM. 2019, pp. 65-74.
Jiashu Zhao, Hongshen Chen, and Dawei Yin. "A Dynamic Product-aware Learning Model for E-commerce Query Intent Understanding". In: CIKM.2019, pp. 1843-1852.
ISA/US, International Search Report and Written Opinion issued in Appl. No. PCT/US2021/052654, dated Feb. 15, 2022, 10 pgs.
Lin et al., "Automatic tagging web services using machine learning techniques", IEEE, 2014, retrieved on [Jan. 27, 2022]. Retrieved from the internet <URL:https://ieeexplore.ieee.org/stamp/stamp.jsp?tp=&arnumber=6927633> entire document.

* cited by examiner

RESPONSIVE CATEGORY PREDICTION FOR USER QUERIES

CROSS-REFERENCE TO RELATED APPLICATION

This application claims the benefit of priority to U.S. provisional application No. 63/085,518, filed Sep. 30, 2020.

TECHNICAL FIELD

This disclosure generally relates to prediction of categories of documents, information, or items that are responsive to a user search query.

BACKGROUND

Predictions of categories of documents, information, or items that are responsive to a user search query may be used in many contexts. For example, category predictions may be applied to narrow a set of potentially responsive documents, information, or items before the search is performed, or the category predictions may be applied to filter, group, and/or rank the results of the search.

SUMMARY

In a first aspect of the present disclosure, a method for determining a category responsive to a user query is disclosed. The method includes receiving a training data set comprising a plurality of data pairs, each data pair comprising: (i) a query; and (ii) an associated one or more categories that are responsive to the query, wherein the one or more categories in the training data set defines a plurality of categories. The method further includes training a machine learning algorithm, according to the training data set, to create a trained model, wherein training the machine learning algorithm includes: creating a first co-occurrence data structure defining co-occurrence of respective word representations of the queries with the plurality of categories, and creating a second co-occurrence data structure defining co-occurrence of respective categories in respective data pairs. The method further includes deploying the trained model to return one or more categories in response to a new query input.

In an embodiment of the first aspect, training the machine learning algorithm further includes separating each query into a respective one or more words that comprise the query, and calculating respective embeddings for each of the one or more words to create a word embeddings set, wherein the word embeddings set comprises the word representations.

In an embodiment of the first aspect, training the machine learning algorithm further includes inputting the first co-occurrence data structure to a self-attention mechanism, wherein the self-attention mechanism outputs a relative correlation between each category and each word representation, and applying the relative correlation between each category and each word representation as a weight set to the word embeddings set.

In an embodiment of the first aspect, training the machine learning algorithm further includes calculating respective embeddings for each of the plurality of categories to create a category embeddings set, wherein defining co-occurrence of respective categories in respective data pairs comprises defining co-occurrence of embeddings respective of categories in respective data pairs.

In an embodiment of the first aspect, training the machine learning algorithm further includes one or more of minimizing a loss in the first co-occurrence data structure in successive training iterations, or minimizing a loss in the second co-occurrence data structure in successive training iterations.

In an embodiment of the first aspect, training the machine learning algorithm further includes minimizing a combined loss in the first co-occurrence data structure and in the second co-occurrence data structure in successive training iterations.

In an embodiment of the first aspect, deploying the trained model to return one or more categories in response to a new query input includes receiving the new user query through an electronic interface, inputting the new user query to the trained model, and outputting the output of the trained model to the user through the electronic interface.

In a second aspect of the present disclosure, a method for determining a category responsive to a user query is disclosed. The method includes receiving a training data set comprising a plurality of data pairs, each data pair including: (i) a query; and (ii) an associated one or more categories that are responsive to the query. The method further includes training a machine learning algorithm, according to the training data set, to create a trained model, wherein training the machine learning algorithm includes defining a first predictive relationship of respective queries to respective categories, defining a second predictive relationship of respective categories to one another, and minimizing a combined loss of the first predictive relationship and the second predictive relationship. The method further includes deploying the trained model to return one or more categories in response to a new query input.

In an embodiment of the second aspect, defining the first predictive relationship comprises creating a first co-occurrence data structure, based on the training data, that defines co-occurrence of respective word representations of the queries with the plurality of categories.

In an embodiment of the second aspect, defining the second predictive relationship comprises creating a second co-occurrence data structure, based on the training data, that includes co-occurrence of respective categories in respective data pairs.

In an embodiment of the second aspect, training the machine learning algorithm further includes separating each query into a respective one or more words that comprise the query, calculating respective embeddings for each of the one or more words to create a word embeddings set, determining a relative correlation between each category and respective word representations of each query in the training data, and applying the relative correlation between each category and each word representation as a weight set to the word embeddings set.

In an embodiment of the second aspect, defining the first predictive relationship of respective queries to respective categories includes separating each query in the training data set into a respective one or more words that comprise the query, and calculating respective embeddings for each of the one or more words to create a word embeddings set, wherein the word embeddings set comprises the word representations.

In an embodiment of the second aspect, the method further includes calculating respective embeddings for each of the categories to create a category embeddings set, wherein defining the second predictive relationship of respective categories to one another includes defining a predictive relationship of embeddings respective of categories in data pairs.

In an embodiment of the second aspect, deploying the trained model to return one or more categories in response to a new query input includes receiving the new user query through an electronic interface, inputting the new user query to the trained model, and outputting the output of the trained model to the user through the electronic interface.

In a third aspect of the present disclosure, a method for determining a category responsive to a user query is disclosed. The method includes receiving the user query through an electronic interface and inputting the user query to a trained machine learning model. The trained model decomposes the new user query into one or more words, calculates word embeddings of the one or more words, calculates, in response to receiving the user query, category embeddings of one or more potentially-responsive categories, and determines one or more of the potentially-responsive categories that are most likely to be responsive to the user query according to the word embeddings and the category embeddings. The method further includes outputting the one or more potentially-responsive categories that are most likely to be responsive to the user query to the user through the electronic interface.

In an embodiment of the third aspect, the method further includes inputting the user query into a ranking algorithm to identify one or more items that are potentially responsive to the new user query, each of the one or more items associated with one or more categories, wherein calculating category embeddings of one or more potentially-responsive categories comprises calculating embeddings of the one or more categories associated with the one or more items.

In an embodiment of the third aspect, outputting the one or more potentially-responsive categories that are most likely to be responsive to the user query to the user through the electronic interface includes outputting one or more items that are within the potentially-responsive categories that are most likely to be responsive to the user query.

In an embodiment of the third aspect, the method further includes receiving a training data set comprising a plurality of data pairs, each data pair including: (i) a query; and (ii) an associated one or more categories that are responsive to the query, and training a machine learning algorithm, according to the training data set, to create the trained model.

In an embodiment of the third aspect, training the machine learning algorithm includes defining a first predictive relationship of respective queries to respective categories, defining a second predictive relationship of respective categories to one another, and minimizing a combined loss of the first predictive relationship and the second predictive relationship.

In an embodiment of the third aspect, training the machine learning algorithm includes creating a first co-occurrence data structure defining co-occurrence of respective word representations of the queries with the plurality of categories, and creating a second co-occurrence data structure defining co-occurrence of respective categories in respective data pairs.

DETAILED DESCRIPTION

Mapping a search query to a set of relevant categories in the product taxonomy is a significant challenge in e-commerce searches for two reasons: 1) training data exhibits severe class imbalance problem due to biased click behavior, and 2) queries with little user feedback (e.g., tail queries) are not well-represented in the training set, and cause difficulties for query understanding. The instant disclosure enables improved category prediction and understanding.

Figure 1:
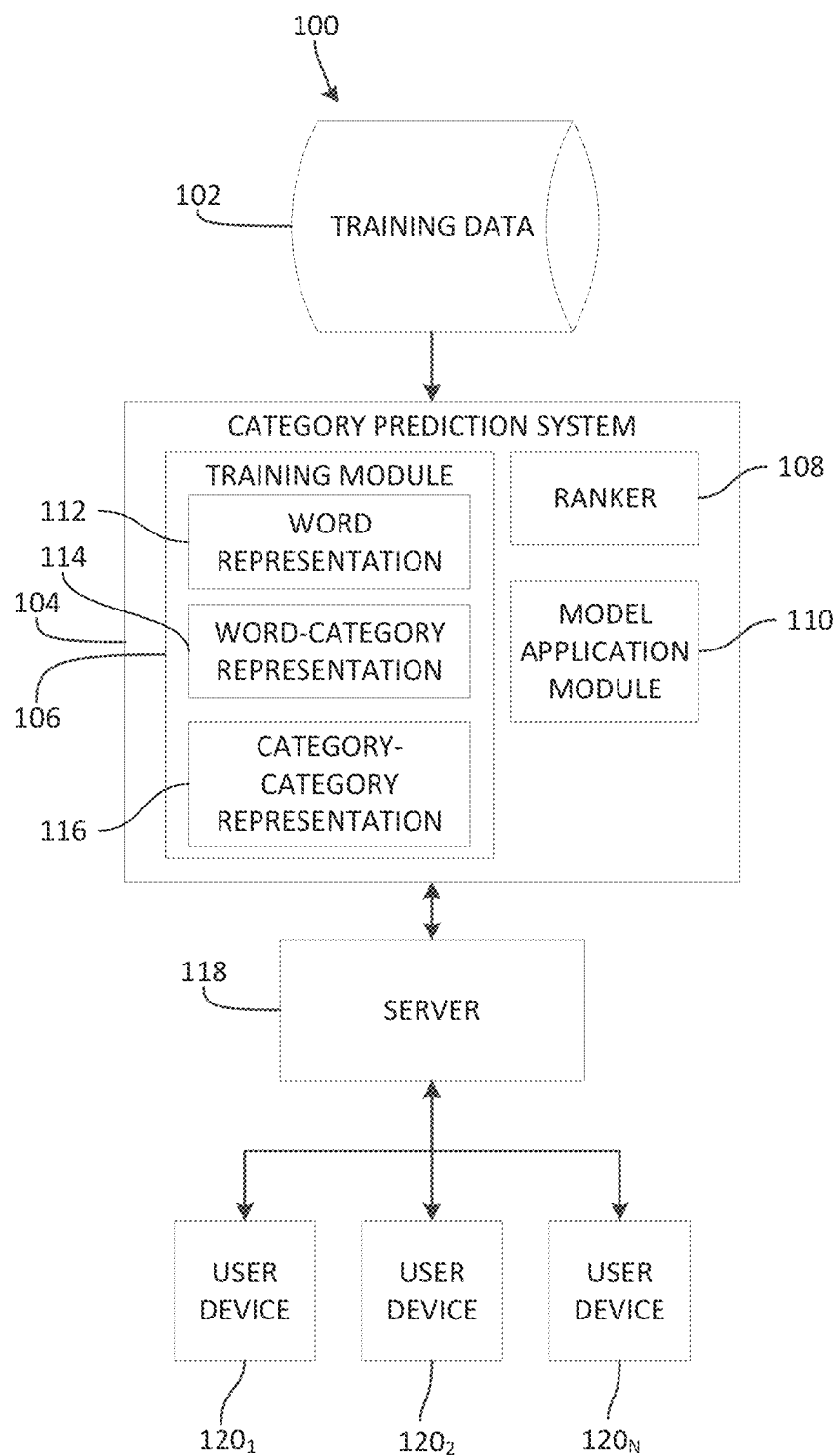
FIG. 1 is a diagrammatic view of an example system for developing and applying a machine learning model for predicting one or more categories responsive to a user query.

Referring now to the drawings, wherein like numerals refer to the same or similar features in the various views, FIG. 1 is a diagrammatic view of an example system 100 for developing and applying a machine learning model for predicting one or more categories responsive to a user query. The system 100 may be used to develop and apply a machine learning model in the context of search functionality on an e-commerce website, for example. The approach of the system 100, however, is applicable to category prediction in any electronic search context.

The system 100 may include a database 102 of training data and a machine learning system 104 that may include one or more functional modules 106, 108, 110 embodied in hardware and/or software. In an embodiment, the functional modules 106, 108, 110 of the machine learning system 104 may be embodied in a processor and a memory storing instructions that, when executed by the processor, cause the processor to perform the functionality of one or more of the functional modules and/or other functionality of this disclosure.

The functional modules 106, 108, 110, of the machine learning system 104 may include a training module 106 that is configured to train one or more machine learning algorithms using training data obtained from the database 102 or another store of training data. The training data may be or may include a plurality of data pairs, each data pair comprising: (i) a query; and (ii) an associated one or more categories that are responsive to the query. The categories present in the training data may collectively include a plurality of categories.

In some embodiments (e.g., in which the system 100 is deployed in an e-commerce context), the plurality of categories may be one or more levels of a hierarchical taxonomy. Accordingly, in a given data pair in the training data, the one or more categories may include a plurality of hierarchically-nested categories at different respective levels of the taxonomy. Additionally or alternatively, in a given data pair in the training data, the one or more categories may include a plurality of categories at the same level of the taxonomy.

Functional details of the training module are provided in Appendix A, which is hereby incorporated by reference in its entirety. A brief description of certain aspects of the training module 106 is provided below.

The training module 106 may be generally configured to train a machine learning algorithm to create a trained model. The trained model may receive a new search query as input and output one or more categories that are predicted to be responsive to the new search query.

The training module may train an architecture that generally includes three components: a word representation portion 112, a word-category representation portion 114, and a category-category representation portion 116.

The word representation portion 112 may be generally configured to generate a word representation of a search query. Among other operations, the word representation portion may separate each query the one or more words that make up the query, and to calculate embeddings for each of those words. The word representation portion 112 may input the word embeddings into a deep learning neural network that outputs a word representation given a set of word embeddings representative of a search query.

The word-category representation portion 114 may generate a representation of a given combination of a search query and a category given the word embeddings of the search query and category embeddings respective of the category. The word-category representation portion may define a predictive relationship between query words and responsive categories, which predictive relationship may be refined through training. For example, the word-category representation portion may, at the beginning of training, create a co-occurrence data structure, such as a co-occurrence matrix, that includes co-occurrence of respective word representations of the queries with the plurality of categories in the training data.

The word-category representation portion 114 may further calculate weights for each word-category combination that reflect the contribution of each word to the association of a query containing that word to a category. For example, the word-category representation portion may input the word-category co-occurrence data structure to a self-attention mechanism, wherein the self-attention mechanism outputs a relative correlation between each category and each word representation. The weights may be applied to the word embeddings set to create a weighted word embeddings set, which may be used and tuned in successive training iterations.

The outputs of the word representation portion and word-category representation portion may be combined to create a first predicted category given an input query. The training module 106 may input the first prediction a loss function, along with the actual responsive category, and the loss may be minimized over successive training iterations.

The category-category representation portion 116 may generate representations of combinations of categories. The category-category representation portion 116 may generate embeddings respective of each category in the training data to create a category embeddings set. The category-category representation portion 116 may define a predictive relationship between pairs of categories, which predictive relationship may be refined over training iterations. For example, the category-category representation portion 116 may, at the beginning of training, create a co-occurrence data structure, such as a co-occurrence matrix, that includes co-occurrence of respective categories with each other in the training data. The category-category co-occurrence data structure may be normalized via a loss function, which loss function may be minimized over successive training iterations.

In some embodiments, the training performed by the training module 106 may seek to minimize one or both of the word-category loss and the category-category loss. In some embodiments, the two losses may be averaged or otherwise combined, and the combined loss (e.g., average loss, such as weighted average loss) may be minimized in successive training iterations.

The training performed by the training module 106 may be performed in a training phase that results in a trained model, which trained model may be deployed for use in responding to user queries. A model application module 110 may apply the trained model to a user search query and a set of potentially-responsive categories to predict the categories that are most likely to be responsive to the query. In some embodiments, the set of potentially-responsive categories may include an entire taxonomy associated with the system that received the user search. The output of the model application module may be one or more categories, which one or more categories may be used to limit, refine, filter, or group results responsive to the user search query. The model application module 110 may be implemented on or in in conjunction with a server providing an electronic interface to users, such as an e-commerce website or other website.

The model application module, via the deployed trained model, may generate embeddings respective of the words of the search query and of the potentially-responsive categories. The word embeddings of the query and the category embeddings may be processed by the word representation, word-category representation, and category-category representation portions of the trained model.

The ranker module 108 may be used in conjunction with the deployed model implementation module. The ranker module 108 may receive or determine a set of results (e.g., documents, information, or items) responsive to the user search query and rank the responsive results. The responsive results may be associated with respective categories. The ranker module 108 may provide the categories associated with the highest-ranked results (e.g., associated with a predetermined quantity of highest-ranking results) to the model application module 110 to serve as the set of potentially-responsive categories that are considered by the model application module 110.

The system 100 may further include a server 118 in electronic communication with the category prediction system 104 and with a plurality of user computing devices $120_1$, $120_2$, ... $120_N$. The server 118 may provide a website, data for a mobile application, or other interface through which the users of the user computing devices 120 may enter search queries and view responsive results. For example, the server 118 may provide an e-commerce website of a retailer that includes listings for one or more products, and in which a list of one or more products may be provided in response to a user search query.

In operation, a user of a device 120 may enter a search query through an interface provided or supported by the server 118, which query may be received by the server 118 from the user device 120, and which query may be received by the category prediction system 104 from the server 118. The category prediction system 104 may input the query into the ranker module 108 and the model application module 110. The model application module 110 may output one or more responsive category predictions which, as noted above, may be used to limit, filter, or group search results that are responsive to the user search query. The predicted responsive categories may therefore be output to the user on the user device 120 by outputting the list of predicted categories, or through the limited, filtered, or grouped search results.

As a result, the machine learning system 104 may improve the user experience on the server-provided interface. Furthermore, by reducing the training data set and eliminating outlier training data points, the machine learning system 104 may improve the efficiency of the machine learning process and improve the classification precision of the resulting model.

Figure 2:
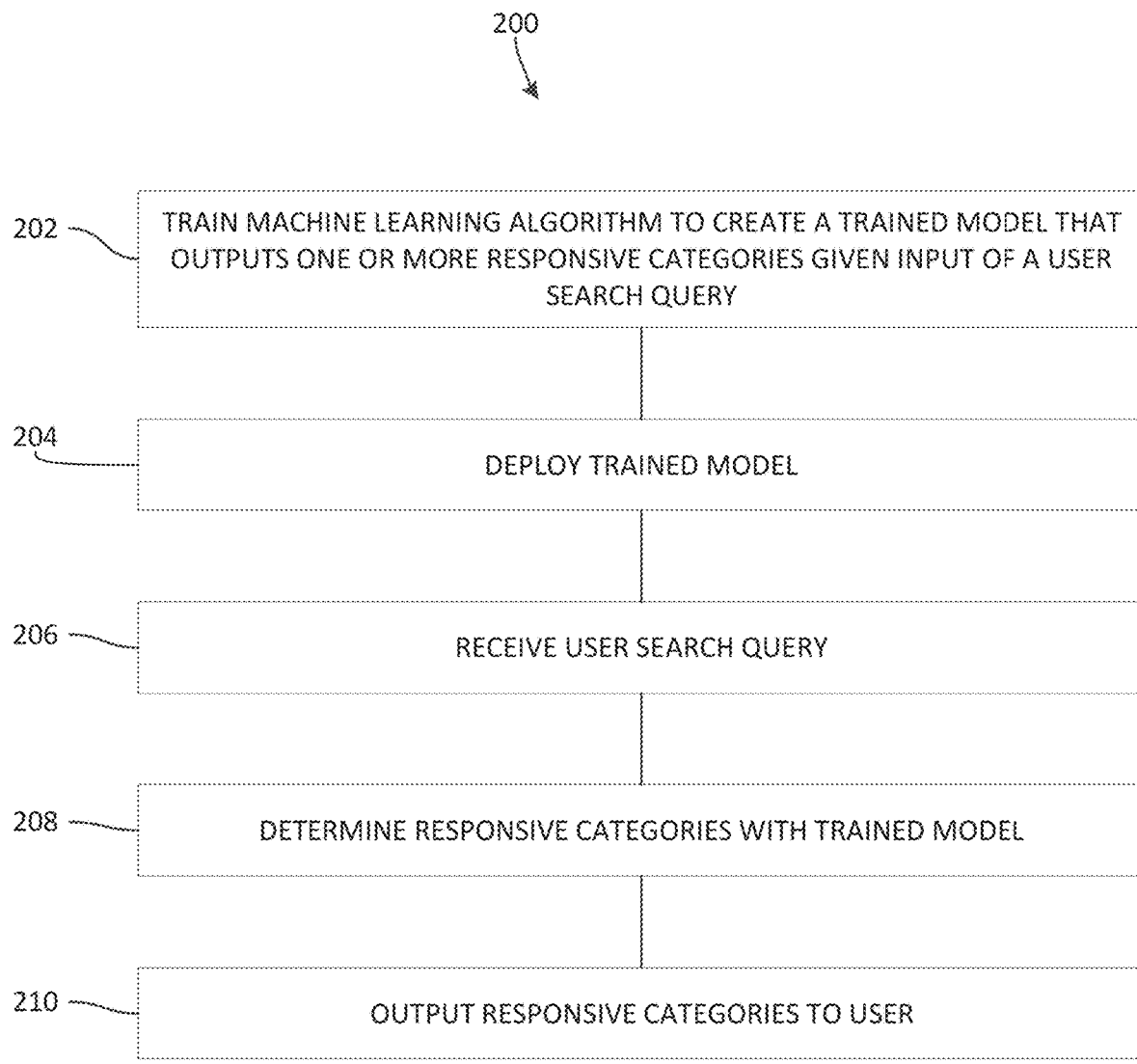
FIG. 2 is a flow chart illustrating an example method of operating a search query interface.

FIG. 2 is a flow chart illustrating an example method 200 of operating a search query interface. One or more portions of the method 200 may be performed by the category prediction system 104 and/or the server 118, in embodiments.

The method 200 may include, at block 202, training a machine learning algorithm to create a trained model that outputs one or more responsive categories given input of a user search query. In an embodiment, block 202 may include performing the method 300 of FIG. 3.

The method 200 may further include, at block 204, deploying the trained model. The trained model may be deployed on a server that hosts a website or other electronic user interface that provides user search functionality, or on a computing device in communication with such a server. The electronic user interface may be a web page on an e-commerce website, in some embodiments. Accordingly, the trained model, once deployed, may receive a user search query as input (e.g., through a website or other interface that accepts user search query input) and output one or more categories that are likely to be responsive to the user search query. In an embodiment in which the user search query was received through an e-commerce website, the categories may be respective of products listed on the website, for example. The one or more categories may be selected from one or more layers of a hierarchical classification system.

The method 200 may further include, at block 206, receiving a user search query. The user search query may be received through the electronic user interface in connection with which the trained model was deployed at block 204.

The method 200 may further include, at block 208, determining one or more categories that are likely to be responsive to the user search query received at block 206 with the trained model. Block 208 may include inputting the received user search query to the trained model.

The method 200 may further include, at block 210, outputting the one or more responsive categories determined at block 208 to the user. The one or more responsive categories may be output to the user in the same interface in which the user entered the search query, in some embodiments. For example, the one or more categories may be output in a suggestion of categories to which the search results will be filtered and restricted. In addition to or instead of outputting the one or more categories to the user, the one or more categories may be provided to or applied by a search engine or website server to limit, filter, or order search results. In some embodiments, block 210 may also include one or more items that are within the potentially-responsive categories that are most likely to be responsive to the user query.

Figure 3:
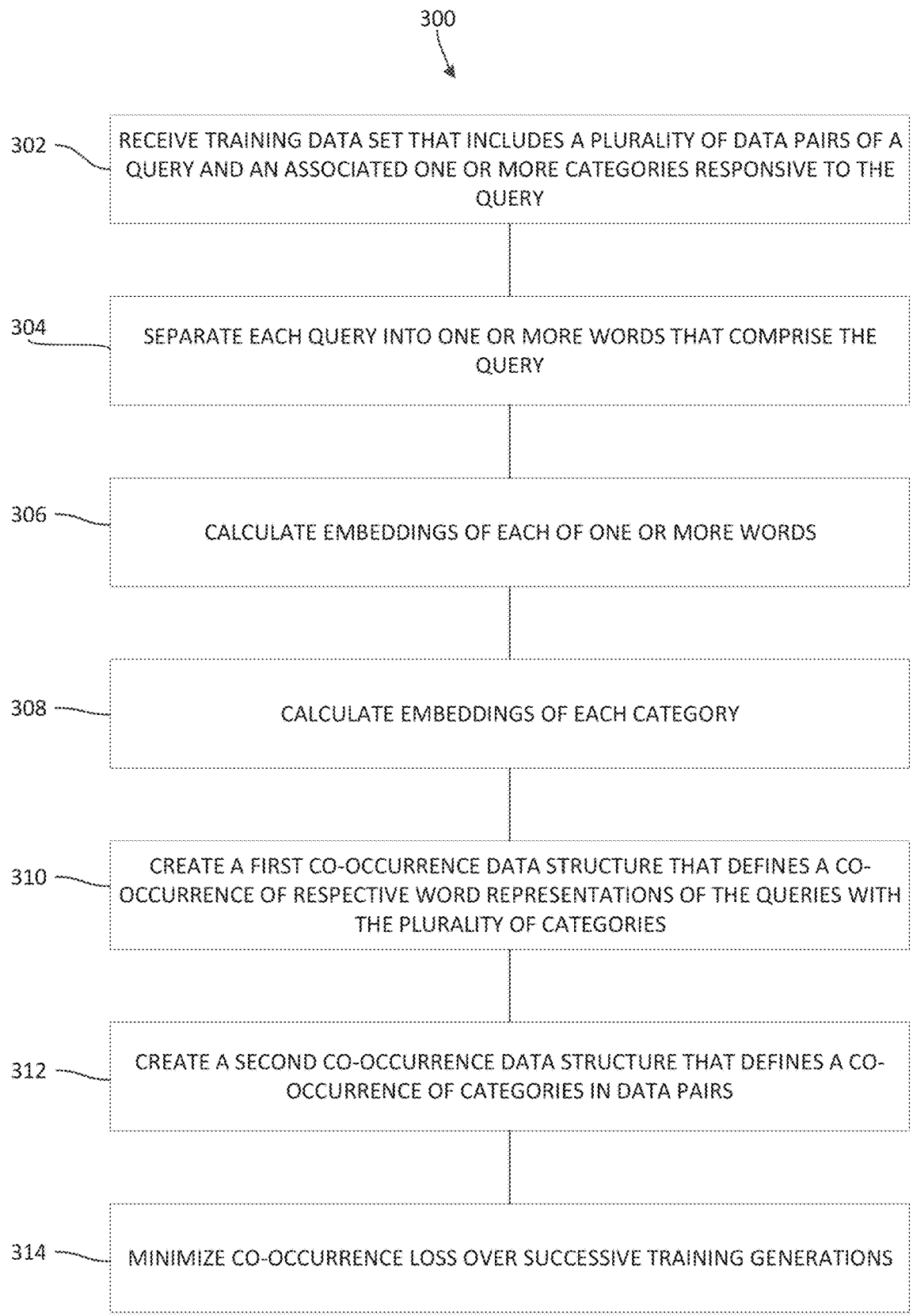
FIG. 3 is a flow chart illustrating an example method of training a query categorization algorithm to create a trained model that may find use in the method of FIG. 2.

FIG. 3 is a flow chart illustrating an example method 300 of training a query categorization algorithm to create a trained model that may find use in the method of FIG. 2. For example, the method 300 may find use at block 202, in some embodiments.

The method 300 may include, ay block 302, receiving a training data set that includes a plurality of data pairs, each data pair including a query and an associated one or more categories that are responsive to the query. Each query may be a query actually entered by a user to a search interface, for example, and the associated one or more categories may be categories within a hierarchical classification schema.

The method 300 may further include, at block 304, separating each query into one or more words that comprise the query.

The method 300 may further include, at block 306, calculating embeddings of each of the one or more words.

The method 300 may further include, at block 308, calculating embeddings of each of the one or more categories in the training data set.

The method 300 may further include, at block 310, creating a first co-occurrence data structure that defines a co-occurrence of respective word representations of the queries with the one or more categories.

The method 300 may further include, at block 312, creating a second co-occurrence data structure that defines a co-occurrence of categories in different data pairs.

The method 300 may further include, at block 314, training a machine learning algorithm that includes the first and second co-occurrence data structures to minimize loss in the co-occurrence data structures. In some embodiments, training the machine learning algorithm may including training the algorithm over multiple generations, with the parameter weights of the algorithm adjusted from generation to generation so as to minimize loss.

Figure 4:
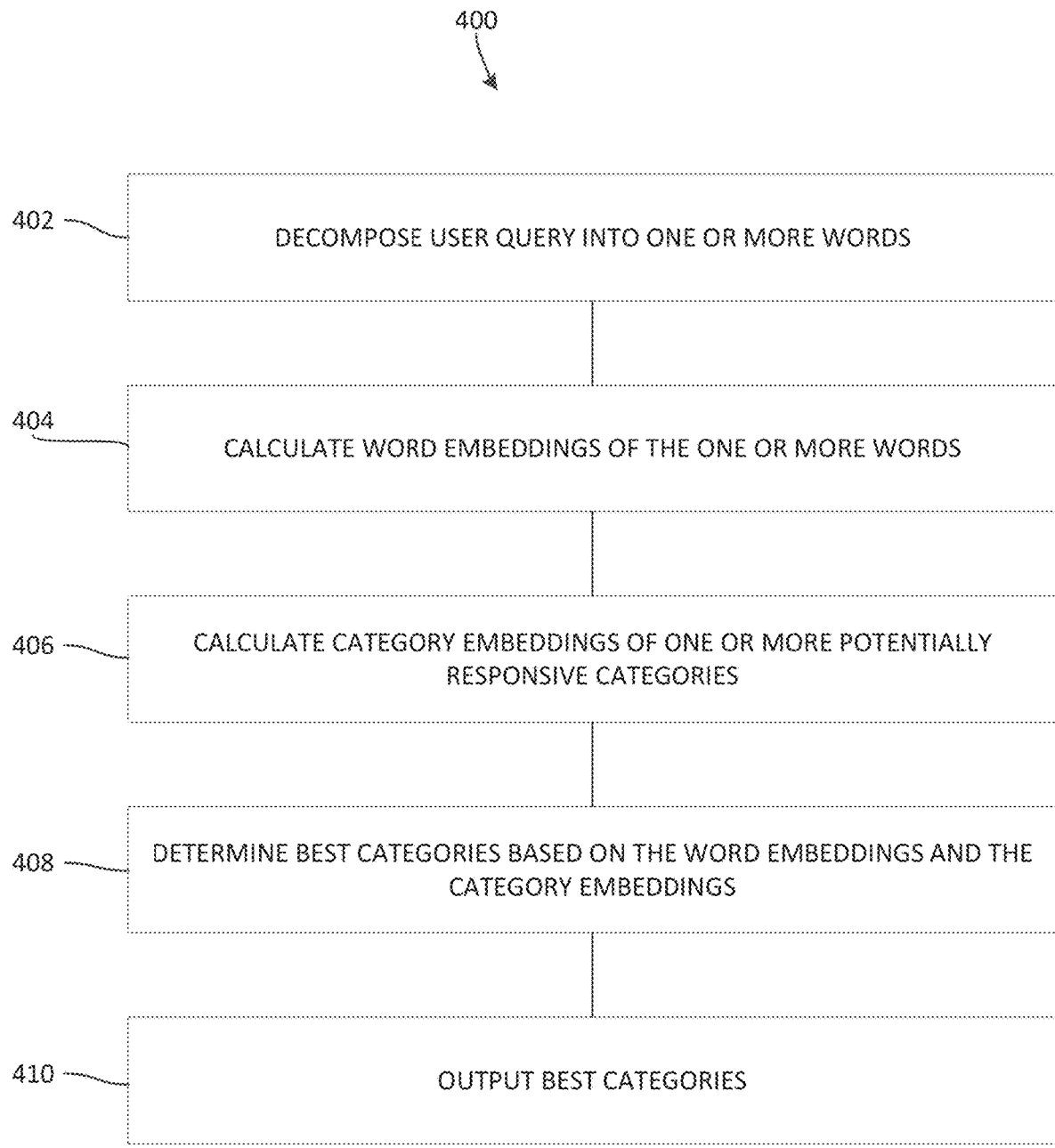
FIG. 4 is a flow chart illustrating an example method of determining and outputting one or more categories responsive to a user search query.

FIG. 4 is a flow chart illustrating an example method 400 of determining and outputting one or more categories responsive to a user search query. The method 400 may find use at blocks 208, 210 of the method 200 of FIG. 2, in some embodiments. The method 400 may be performed substantially in real-time in response to a user search query on a website or other electronic user interface, in some embodiments.

The method 400 may include, at block 402, decomposing a received user query into its one or more component words and, at block 404, calculating word embeddings of each of the one or more words. Block 404 may result in a respective set of embeddings for each distinct word in the user search query.

The method 400 may further include, at block 406, calculating category embeddings of one or more potentially-responsive categories. The set of potentially-responsive categories may include one or more categories from a preexisting taxonomy, in some embodiments. For example, block 406 may include calculating embeddings respective of each category in the preexisting taxonomy. In such embodiments, block 406 may be performed offline, in some embodiments, before block 402, in some embodiments. In some embodiments, block 406 may include inputting the user query into a ranking algorithm to identify one or more items that are potentially responsive to the user query, where each of the one or more items is associated with one or more categories. In such embodiments, calculating category embeddings may include calculating embeddings of the one or more categories associated with the one or more items output by the ranking algorithm.

The method 400 may further include, at block 408, determining one or more best categories based on the calculated word embeddings and the calculated category embeddings and, at block 410, outputting the one or more best categories. The one or more best categories may be the one or more categories that are most likely to be responsive to the user's query, in some embodiments. In some embodiments, outputting the one or more best categories may include outputting one or more items associated with those categories.

Figure 5:
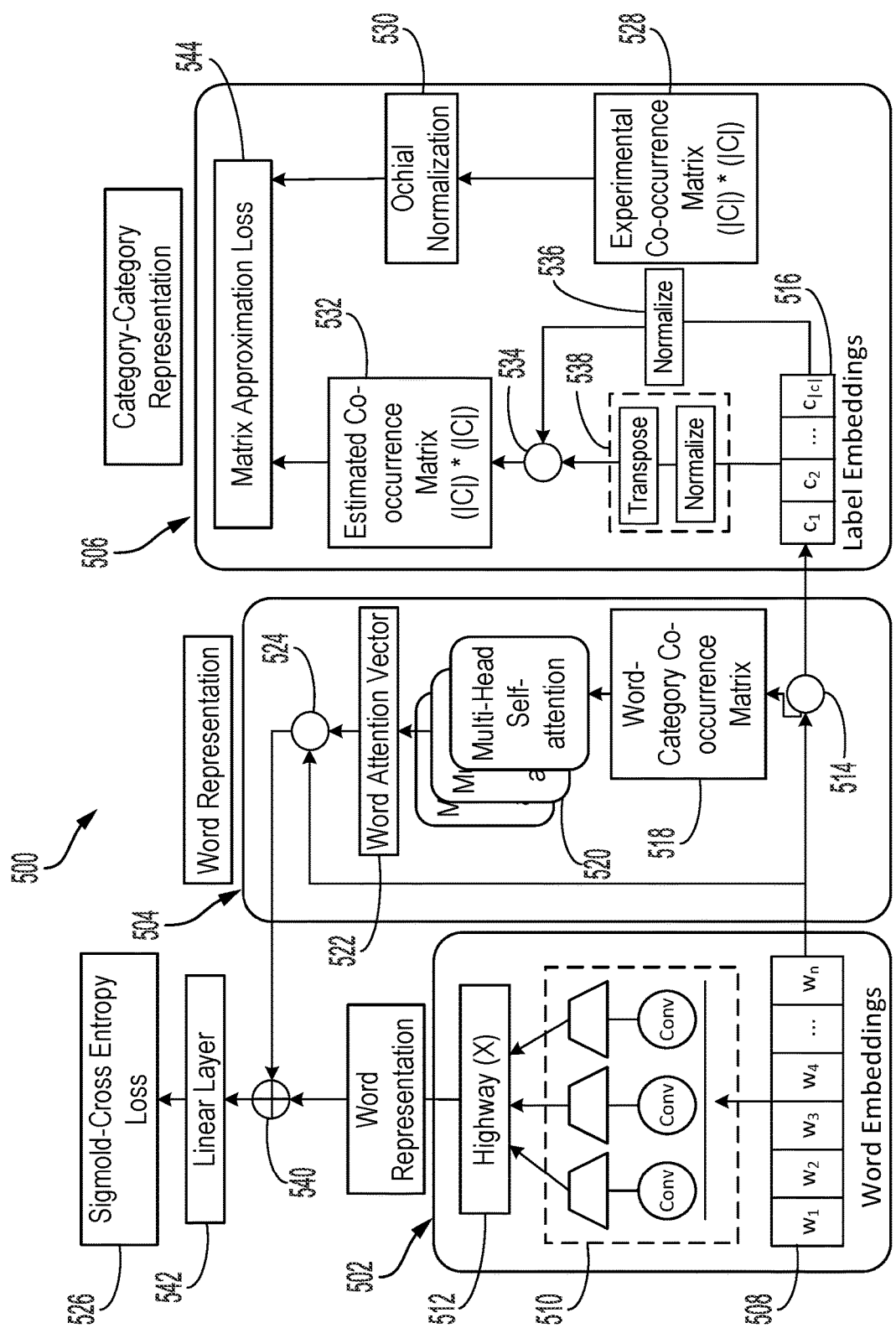
FIG. 5 is a block diagram illustrating an example method for training a machine learning algorithm to create a machine learning model that determines and outputs one or more categories responsive to a user search query.

FIG. 5 is a block diagram illustrating an example network architecture 500 for a machine learning algorithm to create a machine learning model that determines and outputs one or more categories responsive to a user search query. In the illustrated embodiment, the architecture 500 includes a word representation portion 502, a joint-word-category representation portion 504, and a category-category representation portion 506.

To develop the word representation of a query based on word embeddings 508 representative of the query, an appropriately-complex deep network for short text representation may be used. For example, a 3-layer convolution neural network (CNN) model 510 may be used. The word embeddings 508 may be input to the CNN model 510. The output of the CNN model 510 may be input to a highway layer 512. The highway layer 512 may add more non-linearity to the machine learning model and improve the machine learning model capacity by allowing information flow in the network 500.

For the joint-word-category representation portion 504, a dot-product 514 may be applied to query word embeddings 508 and embeddings 516 of categories that are associated with those queries to create a word-category co-occurrence matrix 518. A multi-head self-attention algorithm 520 may be applied to the co-occurrence matrix 518 to determine the contribution of each word to each specific category. The output of the self-attention algorithm 520 may be a word attention vector 522 comprising attention scores that may be combined in a dot product 524 with the word embeddings 508 to which they respectively relate.

Finally, the output of dot product 524 and the output of highway layer 512 may be concatenated to create a query representation. A sigmoid cross-entropy function may be applied to the concatenated representation to compute the loss values respective of the word representations, which loss values may be minimized during training of the algorithm according to the architecture 500.

For the category-category representation portion 506, a category co-occurrence matrix 528 may be initially built according to a set of training data. The co-occurrence matrix 528 may be normalized such as, for example, with a cosine normalization method or equivalent, such as Ochai normalization 530.

In each training step, an estimated co-occurrence matrix 532 may be created based on the label embeddings 516. For example, the estimated co-occurrence matrix may be produced by performing a dot product combination 534 of a normalized version 536 of the label embeddings 516 with a normalized, transposed version 538 of the label embeddings 516. A matrix approximation loss may be calculated based on the normalized, training data-based co-occurrence matrix and the estimated co-occurrence matrix.

Implementation—Word Representation.

In an example, consider a search query dataset D={Q, C}, wherein Q is a set of search queries and C is a set of candidate product categories. Each query consists of a sequence of words $q=[w_1; w_2; \ldots; w_n]$ of size n=10, and is represented as $q_w^{|n| \times V}$. The candidate product category C is mapped to embedding spaces of $C^{|C| \times V}$. The word embeddings 508 and category embeddings 516 may be initialized with Word2Vec and random embeddings of size |V|=100, respectively.

For the word representation, any complex deep learning model may be used for model 510. As noted above, a 3-layer CNN model may be used, which may receive the word embeddings 508 and may output a query representation 3LCNN(qw). The output of the CNN model 3LCNN(qw) may be input to a highway layer 512. A highway layer combines a ReLU function for a non-linear projection, followed by a sigmoid function for smoothing the projection as shown in equation (1) below:

$$\text{highway}(q_w) = \text{relu}(\text{sigmoid}(r)) \qquad (\text{Eq. 1})$$

where highway( ) and r indicate the highway layer and the output of 3LCNN, respectively.

Implementation—Word-Category Representation.

To train the category representation, first, in each training step, a word-category co-occurrence matrix 518 may be defined. The index (i,j) of this matrix indicates the cooccurrence of word i and associated category j of the query. To estimate this matrix during the training, a dot-product 514 between word representations 508 of query(N×V) with the category representations 516(|C|×V). The output is of size (n×|C|), where |n|, |C|, and |V| indicate the query length, number of categories, and embedding size, respectively.

After estimating the word-category co-occurrence matrix 518, the contribution of each word in the query to all product categories may be determined. A self-attention mechanism 520 with a plurality of different heads may be applied to the co-occurrence matrix 518 to compute the contribution scores (i.e., a degree to which each word in the query contributed to that word's association with each product category). For example, ten heads may be used, in some embodiments as a typical query set may include queries that include ten words or fewer. Finally, an attention matrix 522 of size (n×|C|) is created, where the value at (i,j) represents the contribution of word i to category j. The attention matrix 522 is combined with the word embeddings 508 at dot product 524 to generate weighted word embeddings. A multi-head self-attention mechanism may be applied to $q_w$. In some embodiments, the multi-head self-attention contains several linear projections of a single scaled dot-product function that are parallelly implemented. Equations. 2 to 5 illustrate the above steps:

$$\text{head}_i = \text{SoftMax}\left(\frac{q_w K^T}{\sqrt{d_k}}\right) V \qquad (\text{Eq. 2})$$

$$A_{wc} = \text{self\_attention}(l2_{norm(q_w)} \odot l2\_\text{norm}(C)) \qquad (\text{Eq. 3})$$

$$M_{wc} = q_w \odot A_{wc} \qquad (\text{Eq. 4})$$

$$R_{wc} = \text{MaxPooling}(M_{wc}) \qquad (\text{Eq. 5})$$

where (·) indicates a dot-product. $R_{qw}$ and $R_{wc}$ may be concatenated at operation 540 to form R, the final joint word-category representation vector. Finally, R may be input to a linear layer 542 with the size of category classes to generate the final scores for each class.

Implementation—Joint Word-Category Loss. A sigmoid cross-entropy loss function Lw may be applied to the output of the linear layer 542 to determine the final product category classification. Sigmoid cross-entropy may be an appropriate loss function in some embodiments because, in sigmoid, the loss computed for every output $s_t$ is not affected by other component values. An example sigmoid cross-entropy loss function is shown in equation (6) below:

$$\mathcal{L}_w = -\sum_{c=1}^{|C|} t_c \log(\text{Sigmoid}(s_c)) \qquad (\text{Eq. 6})$$

where $s_c$ represents the predictions and $t_c$ indicates the targets.

Implementation—Category-Category Representation.

An initial experimental co-occurrence matrix 528 may be created from training data to model the category-category interactions. In this matrix 528 each element (i,j) represents the co-occurrence frequency between label-pair of ($c_i$, $c_j$) in the training set. The category-category co-occurrence matrix 528 may have the size of (|C|×|C|). Then, the final experimental matrix may be calculated by applying a matrix normalization 530. In some embodiments, Cosine normalization may be applied to normalize the CM, where the values on the main diagonal are one.

Moreover, the experimental category-category co-occurrence matrix computed using category co-occurrences in the training set. To estimate the normalized matrix, the Cosine similarity between category representations may be used. The estimation error may be calculated at block 544 based on a matrix approximation loss of LCM, as shown in equation (7) below:

$$\mathcal{L}_{CM} = \frac{1}{mn}\sum\nolimits_{i,j \in C}\log\bigl(1 + \exp(C\hat{M}_{ij} \odot CM_{ij})\bigr) \qquad \text{(Eq. 7)}$$

Implementation—Overall Loss.

To compute the overall loss, a weighted average of Lww and Lcccc may be calculated, as shown in equation (8) below:

$$\mathcal{L}_{overall} = \lambda_1 \mathcal{L}_{CM} + \lambda_2 \mathcal{L}_W \qquad \text{(Eq. 8)}$$

Figure 6:
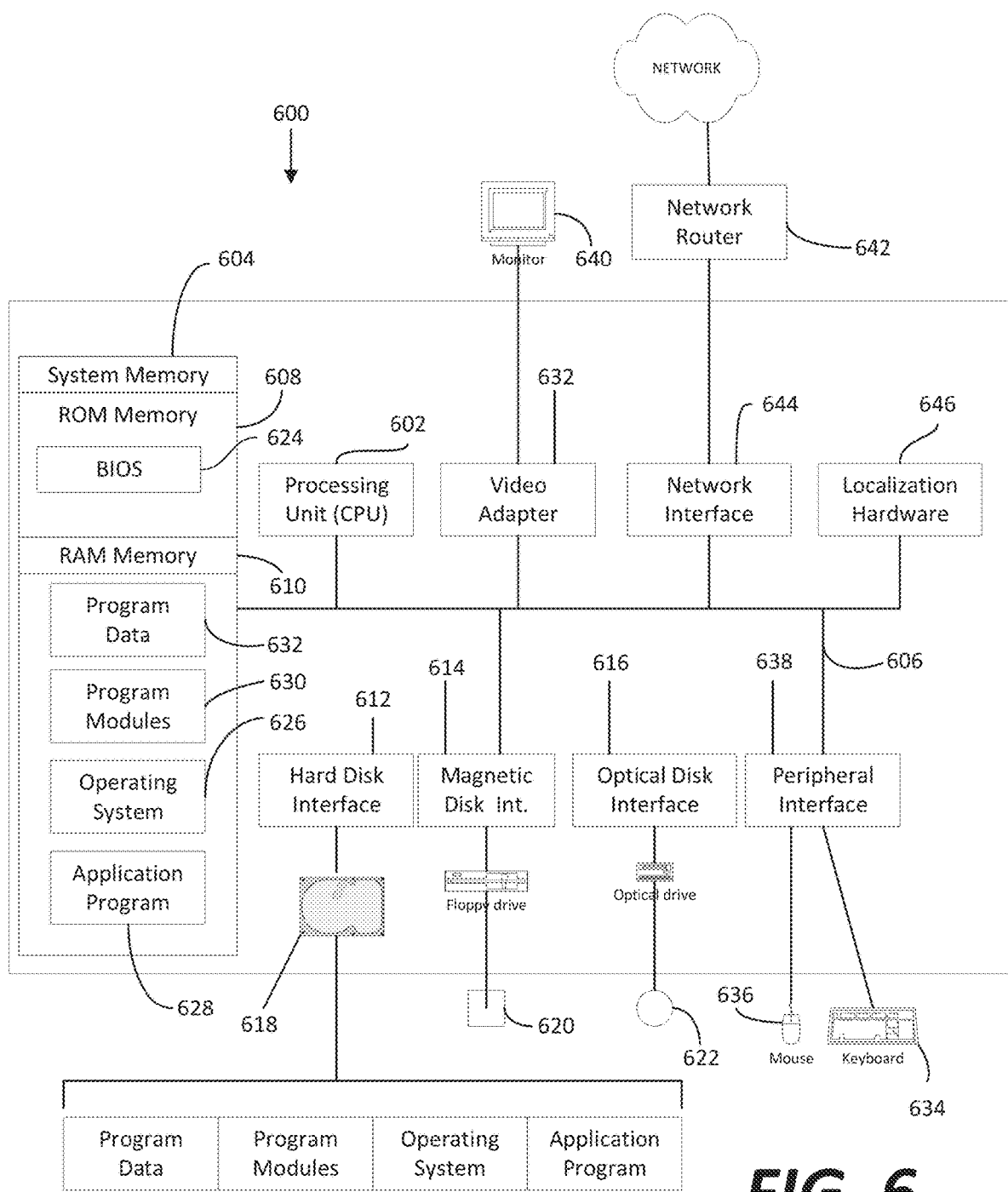
FIG. 6 is a diagrammatic view of an example embodiment of a user computing environment.

FIG. 6 is a diagrammatic view of an example embodiment of a user computing environment that includes a general purpose computing system environment 600, such as a desktop computer, laptop, smartphone, tablet, or any other such device having the ability to execute instructions, such as those stored within a non-transient, computer-readable medium. Furthermore, while described and illustrated in the context of a single computing system 600, those skilled in the art will also appreciate that the various tasks described hereinafter may be practiced in a distributed environment having multiple computing systems 600 linked via a local or wide-area network in which the executable instructions may be associated with and/or executed by one or more of multiple computing systems 600.

In its most basic configuration, computing system environment 600 typically includes at least one processing unit 602 and at least one memory 604, which may be linked via a bus 606. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus 606, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard drive 618, and/or peripheral memory devices may be used to store computer executable instructions comprising an operating system 626, one or more applications programs 628 (which may include the functionality of the category prediction system 104 of FIG. 1 or one or more of its functional modules 108, 110, 112, 114, 116, for example), other program modules 630, and/or program data 622. Still further, computer-executable instructions may be downloaded to the computing environment 600 as needed, for example, via a network connection.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus 606. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus 606 via an interface, such as via video adapter 632. In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 642, that is responsible for network routing. Communications with the network router 642 may be performed via a network interface component 644. Thus, within such a networked environment, e.g., the Internet, World Wide Web, LAN, or other like type of wired or wireless network, it will be appreciated that program modules depicted relative to the computing system environment 600, or portions thereof, may be stored in the memory storage device(s) of the computing system environment 600.

The computing system environment 600 may also include localization hardware 686 for determining a location of the computing system environment 600. In embodiments, the localization hardware 646 may include, for example only, a GPS antenna, an RFID chip or reader, a WiFi antenna, or other computing hardware that may be used to capture or transmit signals that may be used to determine the location of the computing system environment 600.

The computing environment 600, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for determining a category responsive to a user query, the method comprising:
    receiving, by a computing device, a training data set comprising a plurality of data pairs, each data pair comprising: (i) a query; and (ii) an associated one or more categories that are responsive to the query, wherein the one or more categories in the training data set defines a plurality of categories;
    training, by the computing device, a machine learning algorithm, according to the training data set, to create a trained model, wherein training the machine learning algorithm comprises:
        separating, by the computing device, each query into a respective one or more words that comprise the query;
        calculating, by the computing device, respective embeddings corresponding to vectors for each of the one or more words to create a word embeddings set;
        creating, by the computing device, a first co-occurrence data structure defining co-occurrence of respective word representations of the queries with the plurality of categories based on the word embeddings set;
        creating, by the computing device, a second co-occurrence data structure defining co-occurrence of respective categories in respective data pairs based on the word embeddings set;
        inputting, by the computing device, the first co-occurrence data structure to a self-attention mechanism, wherein the self-attention mechanism outputs respective attention vectors representative of each respective word representations contribution to its association with each category; and
        applying, by the computing device, the respective attention vectors indicative of a relative correlation between each category and each word representation as a weight set to the word embeddings set; and
    deploying the trained model to return one or more categories in response to a new query input.

2. The computer-implemented method of claim 1, wherein the word embeddings set comprises the word representations.

3. The computer-implemented method of claim 1, wherein training the machine learning algorithm further comprises:
    calculating respective embeddings for each of the plurality of categories to create a category embeddings set;
    wherein defining co-occurrence of respective categories in respective data pairs comprises defining co-occurrence of embeddings respective of categories in respective data pairs.

4. The computer-implemented method of claim 1, wherein training the machine learning algorithm further comprises one or more of:
    minimizing a loss in the first co-occurrence data structure in successive training iterations; or
    minimizing a loss in the second co-occurrence data structure in successive training iterations.

5. The computer-implemented method of claim 1, wherein training the machine learning algorithm further comprises minimizing a combined loss in the first co-occurrence data structure and in the second co-occurrence data structure in successive training iterations.

6. The computer-implemented method of claim 1, wherein deploying the trained model to return the one or more categories in response to the new query input comprises:

receiving the new user query through an electronic interface;

inputting the new user query to the trained model; and outputting the output of the trained model to the user through the electronic interface.

7. A method for determining a category responsive to a user query, the method comprising:

receiving a training data set comprising a plurality of data pairs, each data pair comprising: (i) a query; and (ii) an associated one or more categories that are responsive to the query;

training a machine learning algorithm, according to the training data set, to create a trained model, wherein training the machine learning algorithm comprises:

separating each query into a respective one or more words that comprise the query;

calculating respective embeddings for each of the one or more words to create a word embeddings set;

defining a first predictive relationship of respective queries to respective categories based on the word embeddings set, wherein defining the first predictive relationship comprises creating a first co-occurrence data structure, based on the training data set, that defines co-occurrence of respective word representations of the queries with the plurality of categories;

defining a second predictive relationship of respective categories to one another based on the word embeddings set, wherein defining the second predictive relationship comprises creating a second co-occurrence data structure, based on the training data set, that includes co-occurrence of respective categories in respective data pairs;

inputting first co-occurrence data structure defining the first predictive relationship to a self-attention mechanism, wherein the self-attention mechanism outputs respective attention vectors representative of each respective word representations contribution to its association with each category corresponding to a relative correlation between each category and each word representation;

applying the relative correlation between each category and each word representation as a weight set to the word embeddings set; and minimizing a combined loss of the first predictive relationship and the second predictive relationship; and deploying the trained model to return one or more categories in response to a new query input.

8. The method of claim 7, wherein the word embeddings set comprises the word representations.

9. The method of claim 7, further comprising:

wherein defining the second predictive relationship of respective categories to one another comprises defining a predictive relationship of embeddings respective of categories in data pairs.

10. The method of claim 7, wherein deploying the trained model to return one or more categories in response to a new query input comprises:

receiving the new user query through an electronic interface;

inputting the new user query to the trained model; and outputting the output of the trained model to the user through the electronic interface.

11. A method for determining a category responsive to a user query, the method comprising:

receiving the user query through an electronic interface;

inputting the user query to a trained machine learning model, wherein the trained machine learning model:

decomposes the user query into one or more words;

calculates respective word embeddings of the one or more words to create a word embedding set;

calculates, in response to receiving the user query, category embeddings of one or more potentially-responsive categories; and determines one or more of the potentially-responsive categories that are most likely to be responsive to the user query according to the word embeddings and the category embeddings and based on a weight corresponding to a correlation between each category and each word representation;

outputting the one or more potentially-responsive categories that are most likely to be responsive to the user query to the user through the electronic interface; and training a machine learning algorithm, according to a training data set, to create the trained machine learning model, wherein training the machine learning algorithm comprises:

creating a first co-occurrence data structure defining co-occurrence of respective word representations of the queries with a plurality of categories based on the word embedding set;

creating a second co-occurrence data structure defining co-occurrence of respective categories in respective data pairs based on the word embedding set; and inputting the first co-occurrence data structure to a self-attention mechanism, wherein the self-attention mechanism outputs respective attention vectors representative of each respective word representations contribution to its association with each category.

12. The method of claim 11, further comprising:

inputting the user query into a ranking algorithm to identify one or more items that are potentially responsive to the user query, each of the one or more items associated with one or more categories;

wherein calculating category embeddings of one or more potentially-responsive categories comprises calculating embeddings of the one or more categories associated with the one or more items.

13. The method of claim 11, wherein outputting the one or more potentially-responsive categories that are most likely to be responsive to the user query to the user through the electronic interface comprises outputting one or more items that are within the one or more potentially-responsive categories that are most likely to be responsive to the user query.

14. The method of claim 11, further comprising:

receiving a training data set comprising a plurality of data pairs, each data pair comprising: (i) a query; and (ii) an associated one or more categories that are responsive to the query.

15. The method of claim 11, wherein training the machine learning algorithm comprises:

defining a first predictive relationship of respective queries to respective categories;

defining a second predictive relationship of respective categories to one another; and minimizing a combined loss of the first predictive relationship and the second predictive relationship.

* * * * *